United States Patent [19]

Smith et al.

[11] Patent Number: 4,792,709
[45] Date of Patent: Dec. 20, 1988

[54] WINDING FOR OPERATION OF A THREE-PHASE STEPPING MOTOR FROM A TWO-PHASE DRIVE

[75] Inventors: Robert C. Smith, Hartford, Conn.; Gary E. Horst, Manchester, Mo.

[73] Assignee: The Superior Electric Company, Bristol, Conn.

[21] Appl. No.: 27,297

[22] Filed: Mar. 18, 1987

[51] Int. Cl.$^4$ ............................................. H02K 37/04
[52] U.S. Cl. ................................. 310/49 R; 310/162; 310/185
[58] Field of Search ................. 310/49, 184, 198, 162, 310/185, 188; 318/685, 696

[56] References Cited

U.S. PATENT DOCUMENTS

| | | | |
|---|---|---|---|
| 3,117,268 | 1/1964 | Madsen | 310/49 R |
| 4,025,810 | 5/1977 | Field | 310/162 |
| 4,029,977 | 6/1977 | Chai et al. | 310/49 |
| 4,516,048 | 5/1985 | Brigham | 310/49 R |

*Primary Examiner*—Patrick R. Salce
*Assistant Examiner*—D. L. Rebsch
*Attorney, Agent, or Firm*—John H. Crozier

[57] ABSTRACT

A three-phase stepping motor having magnetically interacting stationary and moving members, the stationary member having first, second, and third sets of stator poles, each stator pole having thereon a coil for magnetic energization thereof. The coils on the first set of stator poles and one-half of the coils on the third set of stator poles are connected to one phase of a two-phase drive. The coils on the second set of stator poles and the other half of the coils on the third set of stator poles are connected to the other phase of a two-phase drive. The fluxes produced by the currents of the two drive phases are, in effect, magnetically combined in the moving member, as if the third set of poles wewre energized by a "third phase". In one embodiment, a twelve-pole, rotary, three-phase stepping motor with a 50-tooth rotor and a 48-, 50-, 52-, or variable-tooth-pitch stator produces a step angle of 1.8° mechanical with a two-phase drive.

21 Claims, 5 Drawing Sheets

WINDING FOR OPERATION OF A THREE-PHASE STEPPING MOTOR FROM A TWO-PHASE DRIVE

BACKGROUND OF THE INVENTION

1. Field of the Invention

This invention relates to stepping motors, and more particularly to a winding for operating a twelve-pole, three-phase stepping motor from a two-phase drive, such as to produce a step angle other than that which would normally be produced by the motor.

2. Background Art

As is well known, a stepping motor is a device which translates electrical pulses into mechanical movements by causing an output shaft to move a specific incremental distance or "step" for each pulse applied to the motor. As opposed to a conventional motor which has a free-running shaft, the stepping motor shaft moves in fixed, repeatable, known increments, resulting in the ability to accurately position. These motors are controlled by drive circuitry which provides the necessary number, sequence, and rate of pulses to achieve the desired extent of movement.

Stepping motors including synchronous inductor motors of the general type considered here have been described in detail elsewhere, as, for example, in U.S. Pat. No. 3,117,268. There, a rotary stepping motor has a permanent magnet moving member, or rotor, and a stationary member, or stator, comprising a plurality of poles with windings thereon for magnetizing the poles. Both the rotor and the stator have their magnetically coacting peripheries toothed and, when a unidirectional current is selectively applied to energize specific poles, the rotor can be made to rotate a predetermined increment (a "step"). Switching means in the drive circuitry are provided to continuously step the rotor in either direction in response to input control commands or to maintain the rotor at a hold, or stop, position which is the position to which it was last moved.

Very commonly, such a motor has eight stator poles and is a two-phase motor with four of the stator poles connected in one phase and the other four stator poles connected in the other phase, thus resulting in two identical phases with four magnetic poles each, typically referred to as a "four-pole" motor. This type of motor requires a two-phase drive for operation. Such a motor typically produces a mechanical stepping angle of 1.8°. This is determined as follows:

A stepping motor of the type under consideration here usually has 50 teeth around the periphery of the rotor and a stator tooth pitch of 48, 50, or 52, and the rotor is made to rotate in a chosen direction by the following four-step drive sequence, with "positive" and "negative" referring to the polarity of the current in the given phase:

|        | Phase 1 | Phase 2 |
|--------|---------|---------|
| Step 1 | +1      | +1      |
| Step 2 | +1      | −1      |
| Step 3 | −1      | −1      |
| Step 4 | −1      | +1      |

This sequence rotates the rotor an angular distance of one rotor tooth pitch. Thus, the step angle is equal to 360°/(50 rotor teeth)/(four steps) = 1.8° mechanical. Since the electrical field producing flux in the stator rotates through 360° for the movement of the rotor one tooth pitch, each step is equivalent to a 90° change in the electrical field.

It is well known that as the number of stator poles of a stepping motor is increased, there can be a corresponding increase in the torque produced by the motor and, also, smoother operation can be achieved. For the embodiment of the present invention described below, a twelve pole stator was selected. Considerations of commonality dictated that a 50-tooth rotor and a 48-, 50-, 52-, or variable-tooth-pitch stator be used; and, likewise, that the motor produce a step angle of 1.8° mechanical when operated with a two-phase drive, to accommodate existing two-phase drives and applications. Simply operating a twelve-pole stepping motor as a three-phase motor with a three-phase drive would produce a step angle of 1.2° mechanical.

In a copending application, assigned to the assignee of the present invention, an invention is described to achieve operation of a twelve-pole, 50-tooth-rotor stepping motor with a two-phase drive to produce a 1.8° step angle by winding the stator poles to produce three sets of poles. The windings of two of the sets of stator poles have single coils thereon and those sets of poles are connected to the two-phase drive. The current of each of those two sets of poles pass through separate coils on the poles of the third set of stator poles where the fluxes generated by the two currents combine to produce the "third phase" energization.

SUMMARY OF THE INVENTION

The present invention achieves operation of a three-phase, twelve-pole stepping motor from a two-phase drive by winding two phases of four poles each in the normal manner. The "third phase" is produced by passing the current from one of the two phases through the coils on two of the remaining poles and passing the current from the other of the two phases through the other two remaining poles. Rather than combining on the "third phase" poles the fluxes produced by the currents of the first two phases, as described in the above-referenced copending application, the present invention, in effect, combines these fluxes in the moving member to produce the equivalent of a "third phase" energization.

While the present invention is described with reference to an embodiment of a rotary stepping motor employing a twelve-pole, hybrid, 50-tooth-rotor, 48-, 50-, 52-, or variable-tooth-pitch stator, to produce a 1.8° mechanical step angle, it will be understood by one skilled in the art that the teachings of the present invention can be applied as well to stepping motors having other numbers of stator poles, as well as to variable reluctance rotary stepping motors and to linear stepping motors of either the hybrid or variable reluctance type, with the same or with other step angles.

DETAILED DESCRIPTION OF THE INVENTION

Figure 1:
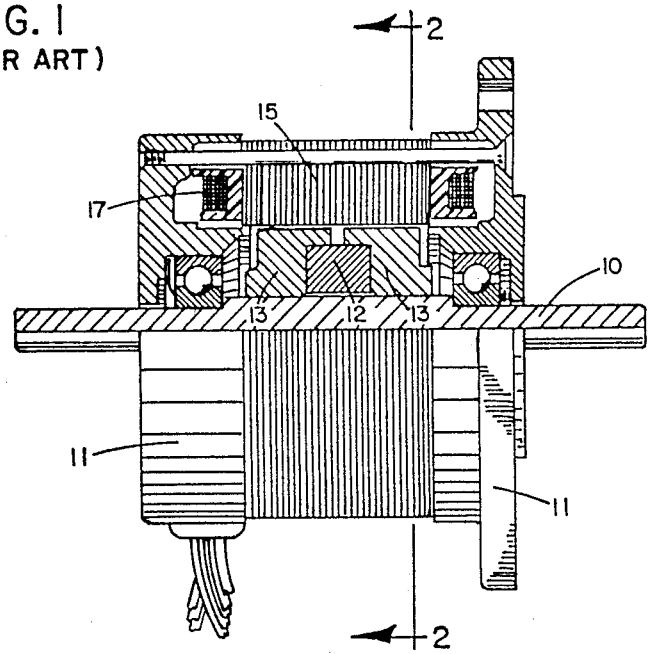
FIG. 1 is a side elevation, partly in section, of a typical conventional stepping motor.
Figure 2:
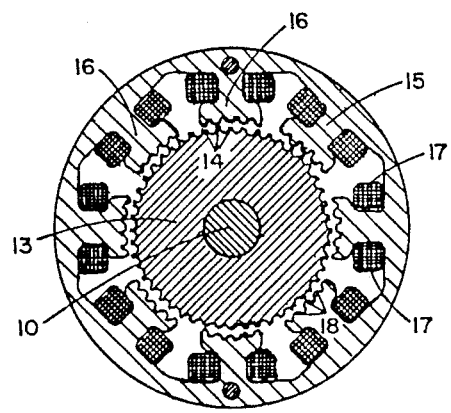
FIG. 2 is a view taken on the line 2—2 of FIG. 1.

Referring to the Drawing, FIGS. 1 and 2 show a typical conventional stepping motor which has a rotor comprising a rotatable shaft 10 projecting beyond generally cylindrical end bells 11. The shaft 10 has a cylindrical, axially-magnetized permanent magnet 12 secured on the shaft 10 with ferromagnetic pole pieces 13 secured on the shaft 10 at each end of the magnet 12. The peripheries of the pole pieces are toothed to provide a plurality of teeth, as at 14, with a total of 50 teeth equidistantly spaced around each periphery. The stator of the motor includes an annular ring 15 formed of laminated ferromagnetic material and fixedly positioned in the end bells 11 so that it is radially aligned around the rotor. The stator is formed, in the specific embodiment shown, to have eight poles 16, although the stator may have any number of poles which are multiples of two. Each pole 16 has a coil 17 associated therewith for magnetizing the pole according to the direction of electrical current in the coil. The pole pieces are formed to provide teeth as at 18 on their inner peripheries. As described above, a conventional stepping motor would be two-phase, with a 48-, 50-, 52-, or variable-tooth-pitch stator, and with the coils 17 on four of the poles 16 connected to form the winding of one phase and with the coils 17 on the other four poles 16 connected to form the winding of the other phase. Rotation of the rotor 10 is provided through the magnetic interaction, or flux linkage, of the rotor 10 and the poles 16 by changing the magnetization of the poles 16 according to the stepwise sequence described above. The sequence shown would produce rotation in one direction, while reversing the sequence would produce rotation in the opposite direction. A variable-tooth-pitch stator of the type noted above is described in U.S. Pat. No. 4,516,048 assigned to the assignee of the present invention.

Considering now a conventional twelve-pole, three-phase stepping motor with a three-phase drive, the electrical phase angle of the field in the stator and the current level in each winding phase of a particular motor may be indicated as follows:

| Electrical Phase Angle | Current | | |
|---|---|---|---|
| | Phase A | Phase C | Phase B |
| 0° | 0 | +.86 | +.86 |
| 30° | +.5 | +.5 | +1 |
| 60° | +.86 | 0 | +.86 |
| 90° | +1 | −.5 | +.5 |
| 120° | +.86 | −.86 | 0 |
| 150° | +.5 | −1 | −.5 |
| 180° | 0 | −.86 | −.86 |
| 210° | −.5 | −.5 | −1 |
| 240° | −.86 | 0 | −.86 |
| 270° | −1 | +.5 | −.5 |
| 300° | −.86 | +.86 | 0 |
| 330° | −.5 | +1 | +.5 |
| 360° | 0 | +.86 | +.86 |

The current values for phase angles of 30°, 120°, 210°, and 300° are repeated in the table below, for convenience in comparison, together with the four-step phase energization sequence which produces 90° electrical phase changes in a conventional stepping motor.

| Three-Phase Motor/Drive | | | | Two-Phase Motor/Drive | | |
|---|---|---|---|---|---|---|
| Electrical Phase Angle | Phase A | Phase C | Phase B | Electrical Phase Angle | Phase 1 | Phase 2 |
| 30° | +.5 | +.5 | +1 | 90° | +1 | +1 |
| 120° | +.86 | −.86 | 0 | 180° | +1 | −1 |
| 210° | −.5 | −.5 | −1 | 270° | −1 | −1 |
| 300° | −.86 | +.86 | 0 | 360° | −1 | +1 |

It can be seen that at each of the phase angles chosen for the three-phase motor/drive, which angles are 90° electrical apart, the current levels for Phase A and Phase C are equal in absolute magnitude and the polarities are the same as for the corresponding Phase 1 and Phase 2 current levels for the two-phase motor/drive. It can also be seen that Phase B is the sum of Phases A and C. Therefore, if Phases A and C could be physically summed to provide Phase B, the three-phase motor could be operated from a two-phase drive with the following four-step sequence to produce a 1.8° step angle:

| | Phase A | Phase C | Phase B |
|---|---|---|---|
| Step 1 | +1 | +1 | +2 |
| Step 2 | +1 | −1 | 0 |
| Step 3 | −1 | −1 | −2 |
| Step 4 | −1 | +1 | 0 |

Since the Phase A and Phase C currents cannot conveniently be combined directly because of limitations of the drive, the present invention combines Phases A and C magnetically by passing the current from Phase A through the coils on one-half of what would ordinarily be the Phase B stator poles and passing the current from Phase C through the coils on the other half of the Phase B stator poles. This, in effect, combines in the moving member the fluxes produced by the two halves of the Phase B stator poles to produce Phase B energization, as if Phase B had been wound as a separate phase and energized by a third drive phase in the sequence shown in the table immediately above.

Figure 3A:
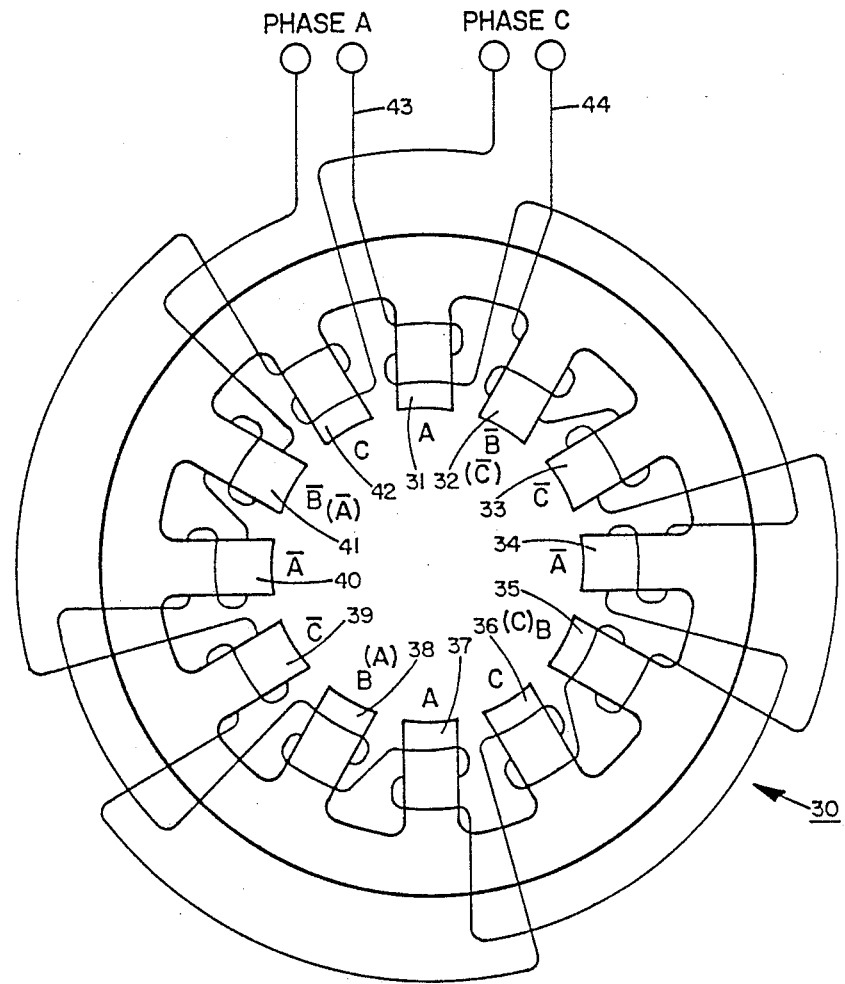
FIG. 3(a) is a cross section of a stator according to one embodiment of the present invention.

A winding scheme, according to one embodiment of the present invention, is shown on FIG. 3(a) in a cross-section of a stator, indicated by the reference numeral 30, which includes twelve poles 31 through 42. The poles 31 through 42 are equally divided between three motor phases, A, B, and C, as indicated by the letters next to the pole faces. The poles indicated by the letters $\overline{A}$ $\overline{B}$ and $\overline{C}$ are included in Phases A, B, and C, respectively, and indicate opposite magnetic polarity. For example, when the A poles have a N magnetic polarity, the $\overline{A}$ poles will have a S magnetic polarity by virtue of the fact that the coils on the $\overline{A}$ poles are wound in a direction opposite that from the A poles. The letter adjacent a B phase symbol indicates the source of the current energizing that pole. For example "B(C)" indicates that the Phase B pole identified has as its source of current Phase C.

A conductor 43 from the Phase A drive (not shown) is wound about pole 1 to form, say, a N magnetization of that pole with the application of positive current. Proceeding clockwise, that conductor is then serially wound about pole 34 to produce a S pole and pole 37 to produce a N pole, both of the A phase; then serially wound about pole 38 to produce a N pple of the B phase; then wound about pole 40 to produce a S pole of the A phase; and finally about pole 41 to produce a S pole of the B phase. Similarly, proceeding clockwise and considering a positive current, a conductor 44 from the Phase C drive is serially wound about: pole 32 to produce a S pole of the B phase, pole 33 to produce a S pole of the C phase; pole 35 to produce a N pole of the B phase; and poles 36, 39, and 42 to produce N, S, and N poles, respectively, of the C phase.

Figure 3B:
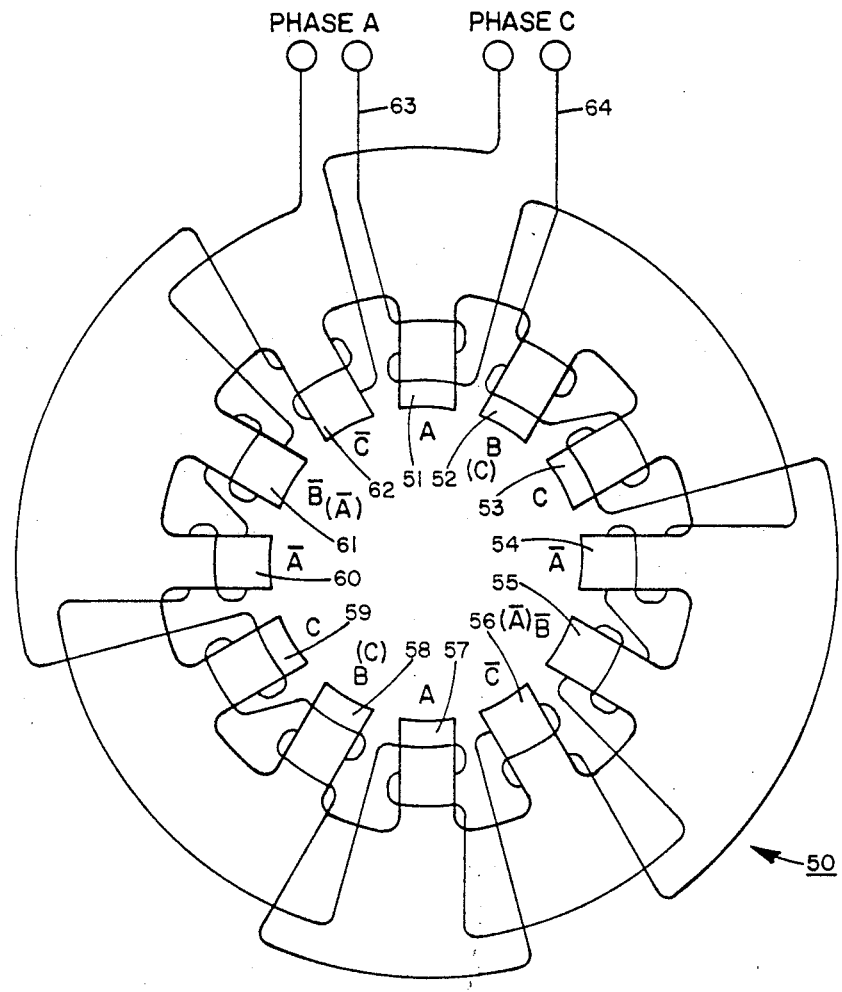
FIG. 3(b) is a cross section of a stator according to another embodiment of the present invention.

FIG. 3(b) is a schematic of another embodiment of the present invention, distinguished from the embodiment shown in FIG. 3(a) in that in the embodiment shown on FIG. 3(b) similarly magnetized poles of the B phase are spaced 180° apart, whereas, in the embodiment shown on FIG. 3(a), similarly magnetized poles of the B phase are spaced 90° apart. Here, the stator, generally indicated by the reference numeral 50, has poles 51 through 62. A conductor 63 from the Phase A drive (not shown) is wound about pole 51 to produce, say, a N magnetization of that pole with a positive current. Proceeding clockwise, that conductor is then serially wound about pole 54 of the A phase to produce a S magnetization; then about pole 55 of the B phase to produce a S magnetization, then about poles 57 and 60 of the A phase to produce N and S magnetizations, respectively, and then about pole 61 of the B phase to produce a S magnetization of that pole. Similarly, proceeding clockwise and considering a positive current, a conductor 64 from the Phase C drive is wound about pole 52 of Phase B to produce a N magnetization of that pole, then pole 53 of Phase C for N magnetization, pole 56 of Phase C for S magnetization, pole 58 of Phase B for N magnetization, pole 59 of Phase C for N magnetization, and pole 62 of Phase C for S magnetization.

Although FIGS. 3(a) and 3(b) show the coils on the stator poles as serially connected to the drive, it will be understood that the coils may, as an alternative, be connected to the drive in parallel.

FIGS. 4(a) through 4(e) indicate the stepping action of a twelve-pole stepping motor constructed with the stator shown on FIG. 3(a). The figures show, in cross-section, a stator 70 and the S-magnetized end of a rotor 71 of a hybrid stepping motor. For greater clarity, the stator 70 is shown unwound and the rotor 31 is shown as having only 10 teeth; however, it will be understood that the principle of operation is the same as with a 50-tooth rotor, except that, in the case shown, a 9.0° step angle is produced. The poles of the stator 70 are related to Phases A, B, and C in the same manner as show"on FIG. 3, as indicated by the reference letters around the perimeter of the stator. The polarities of the poles for a given energization are indicated by the letters N and S on the poles and the bold dashed lines indicate the effective field N and S poles of the stator as a whole.

Figure 4A:
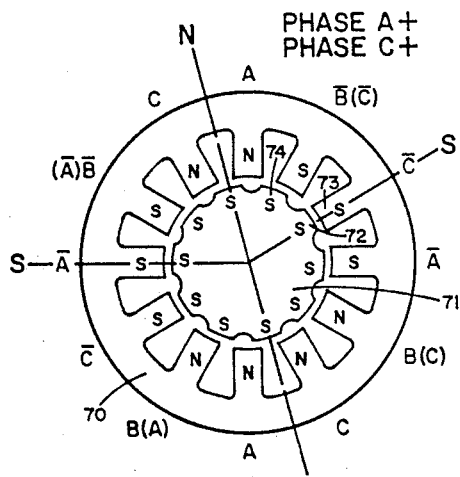
FIGS. 4(a) through 4(e) show the stepping of the rotor of a stepping motor constructed according to the embodiment shown on FIG. 3(a).
Figure 4B:
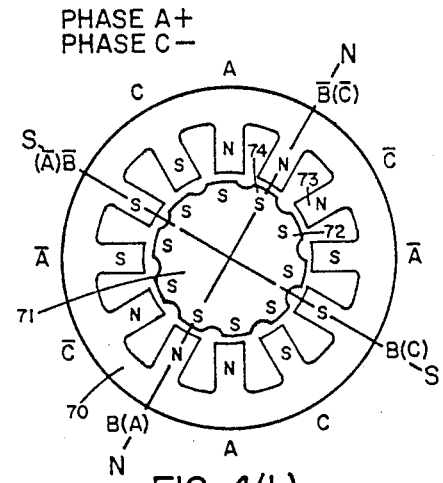
Figure 4C:
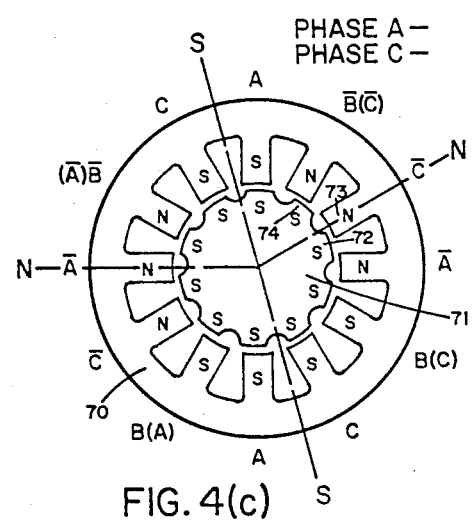
Figure 4D:
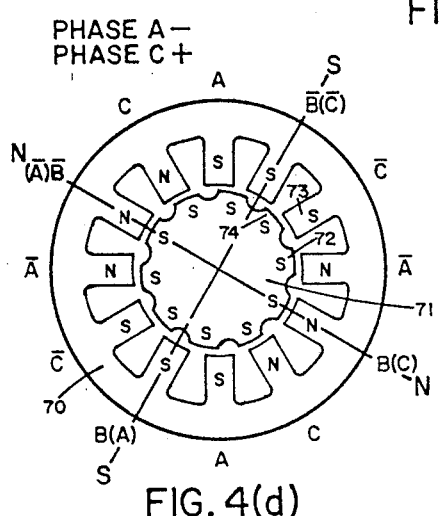
Figure 4E:
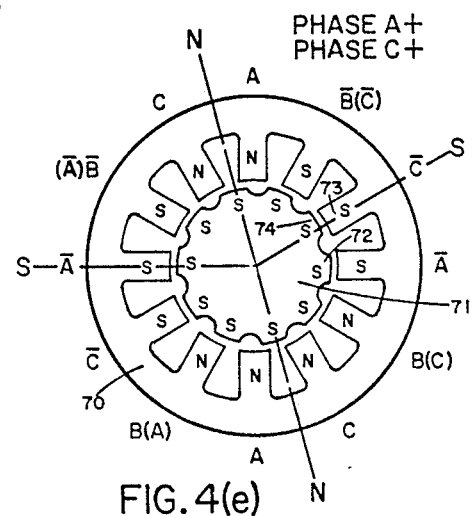
Figure 5A:
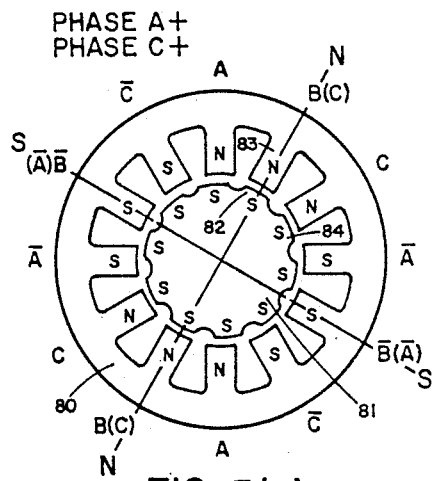
FIGS. 5(a) through 5(e) show the stepping of the rotor of a stepping motor constructed according to the embodiment shown on FIG. 3(b).
Figure 5B:
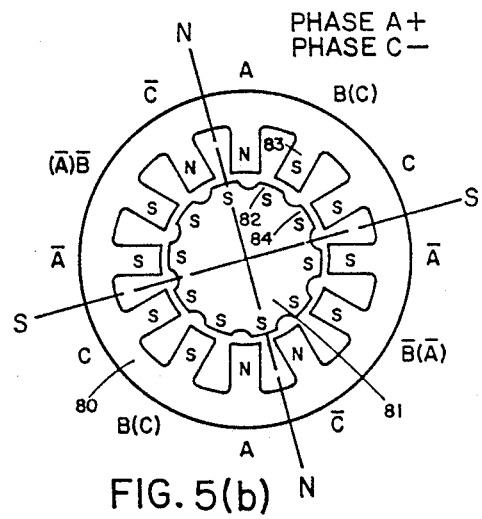
Figure 5C:
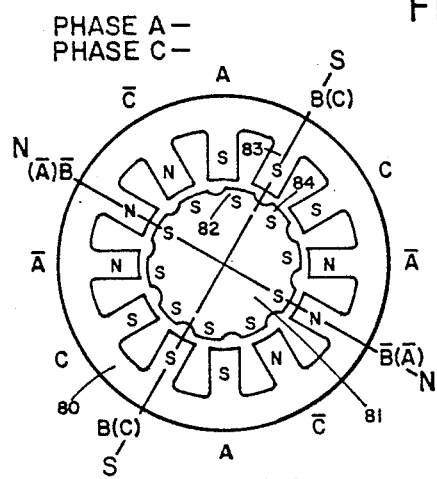
Figure 5D:
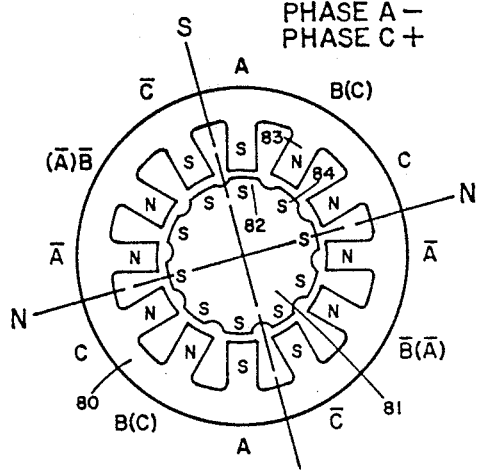
Figure 5E:
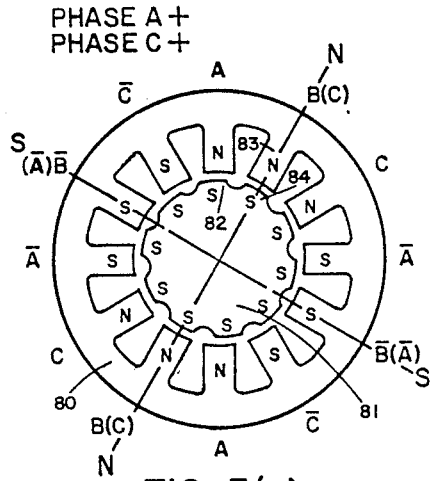

The first energization, FIG. 4(a) shows the polarities produced when Phases A and C are both positive. In this embodiment and with this energization, the effective S field poles are displaced 15° from orthogonality with the effective N field poles. It is seen that rotor pole 72 is in full alignment with stator pole 73. With the first change in energization, FIG. 4(b), Phase A is positive and Phase C is negative, the field flux has rotated essentially 90° clockwise and rotor tooth 72 has rotated one-quarter tooth pitch clockwise. In this energization, the field poles are orthogonal. With the second change in energization, FIG. 4(c), the rotor has rotated one-half a rotor tooth pitch clockwise. Here, the N field poles are displaced 15° from orthogonality with the S field poles. The third change in energization, FIG. 4(d), rotates the rotor another one-quarter rotor tooth pitch; and, with the next change in energization, FIG. 4(e), Phases A and C are again both positive, as in FIG. 4(a), and rotor tooth 74 is now in full alignment with stator pole 73. Thus, the rotor has rotated four one-quarter rotor tooth pitches, or one tooth pitch, as the polarity of the stator field has rotated in four 90° electrical increments: the same as a conventional two-phase, eight-pole stepping motor. If the phases were energized in the reverse sequence, the stator field and, thus, the rotor would rotate in a counterclockwise direction.

The lack of orthogonality of the field poles noted with reference to FIGS. 4(a) and (c) causes some inaccuracies in the step angle and it has been found that the stator winding shown on FIG. 3(b) provides greater step accuracy. FIGS. 5(a) through 5(e) indicate the stepping action of a twelve-pole stepping motor constructed with the stator shown on FIG. 3(b) The figures show, in cross-section, a stator 80 and the S-magnetized end of a rotor 81 of a hybrid stepping motor. As in FIGS. 4(a)- through 4(e), the stator 80 is shown unwound and the rotor 81 has 10 teeth, again for greater clarity. The stepping sequence of FIGS. 5(a) through 5(e)- is similar to that of FIGS. 4(a) through 4(e), except that the field on FIGS. 5(a) through 5(e) rotates counterclockwise for the energization sequence shown. Rotor teeth 82 and 84 and stator pole 83 are identified in each figure so that the stepping of the rotor 81 may be followed. It is seen that with the first energization, FIG. 5(a), rotor tooth 82 is in full alignment with stator pole 83. At the end of the four-step sequence, FIG. 5(e), rotor tooth 84 is in full alignment with stator pole 83 and, thus, the four-step sequence has rotated the rotor 81 one rotor tooth.

The present invention has been described, for convenience, as applied to a three-phase stepping motor driven by a two-phase drive in a full-stepping mode with 90° electrical phase changes. While the three-phase motor will operate in this mode, it has been found that there is some torque ripple at the motor shaft. An inspection of the current levels in the three phases given in the table immediately above also shows that it is evident that this mode of operation will cause torque ripple. It has been found that, with the same motor winding configuration of the present invention and a two-phase drive, torque ripple is substantially attenuated when such a motor is operated in a microstepping mode with 60° electrical phase changes.

It will be understood that what has been disclosed is a novel winding for operating a three-phase stepping motor from a two-phase drive to produce a step angle other than that which would normally be produced by the motor.

Since certain changes may be made in carrying out the above invention without departing from the scope thereof, it is intended that all matter contained in the above description or shown in the accompanying Drawing shall be interpreted as illustrative and not in a limiting sense.

It is also intended that the following claims are intended to cover all of the generic and specific features of the invention herein described, and all statements of the scope of the invention which, as a matter of language, might be said to fall therebetween.

We claim:

1. A three-phase stepping motor adapted to be driven from a two-phase drive, comprising:
   (a) a moving member magnetically interacting with a stationary member;
   (b) the stationary member having first, second, and third sets of poles, each pole having thereon a coil for magnetic energization thereof;
   (c) the coils on the first set of poles and one-half of the coils on the third set of poles being connected to one phase of the drive; and
   (d) the coils on the second set of poles and the other half of the coils on the third set of poles being connected to the other phase of the drive.

2. A three-phase stepping motor adapted to be driven from a two-phase drive, comprising:
   (a) a moving member magnetically interacting with a stationary member;
   (b) the stationary member having n total poles, where n/6=an integer, comprising first, second, and third sets of poles, each pole having thereon a coil for magnetic energization thereof;
   (c) the first, second, and third sets having n/3 poles each;
   (d) the coils on the first set of poles and one-half of the coils on the third set of poles being connected to one phase of the drive; and
   (e) the coils on the second set of poles and the other half of the coils on the third set of poles being connected to the other phase of the drive.

3. A three-phase stepping motor adapted to be driven by a two-phase drive, comprising:
   (a) a moving member magnetically interacting with a stationary member;
   (b) the stationary member having first through twelfth poles, each pole having thereon a coil for magnetic energization thereof;
   (c) the first, fifth, sixth, seventh, eighth, and twelfth poles having the coils thereon wound in one direction;
   (d) the second, third, fourth, ninth, tenth, and eleventh poles having the coils thereon wound in the opposite direction;
   (e) the coils on the first, fourth, seventh, eighth, tenth, and eleventh poles being connected to one phase of the drive; and
   (f) the coils on the second, third, fifth, sixth, ninth, and twelfth poles being connected to the other phase of the drive.

4. A three-phase stepping motor adapted to be driven by a two-phase drive, comprising:
   (a) a moving member magnetically interacting with a stationary member;
   (b) the stationary member having first through twelfth poles, each pole having thereon a coil for magnetic energization thereof;
   (c) the first, second, third, seventh, eighth, and ninth poles having the coils thereon wound in one direction;
   (d) the fourth, fifth, sixth, tenth, eleventh, and twelfth poles having the coils thereon wound in the opposite direction;
   (e) the coils on the first, fourth, fifth, seventh, tenth, and eleventh poles being connected to one phase of the drive; and
   (f) the coils on the second, third, sixth, eighth, ninth, and twelfth poles being connected to the other phase of the drive.

5. The motor as defined in claim 1, wherein: the moving and stationary members have toothed magnetically interacting structures, such that when the drive phases are energized in the four-step sequence: positive/positive, positive/negative, negative/negative, negative/positive, the moving member will move one tooth pitch for each four-step change in energization.

6. The motor as defined in claim 2, wherein: the moving and stationary members have toothed magnetically interacting structures, such that when the drive phases are energized in the four-step sequence: positive/positive, positive/negative, negative/negative, negative/positive, the moving member moves one tooth pitch for each four-step change in energization.

7. The motor as defined in claim 3, wherein: the moving and stationary members have toothed magnetically interacting structures, such that when the drive phases are energized in the four-step sequence: positive/positive, positive/negative, negative/negative, negative/positive, the moving member moves one tooth pitch for each four-step change in energization.

8. The motor as defined in claim 4, wherein: the moving and stationary members have toothed magnetically interacting structures, such that when the drive phases are energized in the four-step sequence: positive/positive, positive/negative, negative/negative, negative/positive, the moving member moves one tooth pitch for each four-step change in energization.

9. A rotary, three-phase stepping motor adapted to be driven from a two-phase drive, comprising:
   (a) a cylindrical rotor having longitudinal, equidistantly-spaced teeth around the periphery thereof;
   (b) a stator having toothed poles radially disposed about the rotor, such that the teeth of the rotor and the teeth of the stator poles may magnetically interact to cause rotation of the rotor upon energization of the stator poles;
   (c) the stator poles comprising first, second, and third sets of equal numbers of poles, each pole having thereon a coil for magnetic energization thereof;
   (d) the coils on the first set of poles and one-half of the coils on the third set of poles being connected to one phase of the drive; and
   (e) the coils on the second set of poles and the other half of the coils on the third set of poles being connected to the other phase of the drive.

10. The stepping motor as defined in claim 9, wherein:
    (a) the total number of stator poles is twelve;
    (b) the first, fifth, sixth, seventh, eighth, and twelfth stator poles having the coils thereon wound in one direction;
    (c) the second, third, fourth, ninth, tenth, and eleventh stator poles having the coils thereon wound in the other direction;
    (d) the coils on the first, fourth, seventh, eighth, tenth, and eleventh stator poles being connected to one phase of the drive; and
    (e) the coils on the second, third, fifth, sixth, ninth, and twelfth stator poles being connected to the other phase of the drive.

11. The stepping motor as defined in claim 9, wherein
    (a) the total number of stator poles is twelve;
    (b) the first, second, third, seventh, eighth, and ninth stator poles having the coils thereon wound in one direction;

(d) the fourth, fifth, sixth, tenth, eleventh, and twelfth stator poles having the coils thereon wound in the opposite direction;

(e) the coils on the first, fourth, fifth, seventh, tenth, and eleventh stator poles being connected to one phase of the drive; and (f) the coils on the second, third, sixth, eighth, ninth, and twelfth stator poles being connected to the other phase of the drive.

12. The stepping motor as defined in claim 10, wherein:
(a) the rotor has 50 teeth;
(b) the stator has a 48-tooth pitch; and
(c) when the drive phases are energized in the four-step sequence: positive/positive, positive/negative, negative/negative, and negative/positive, the rotor will rotate one tooth pitch for each four-step change in energization.

13. The stepping motor as defined in claim 10, wherein:
(a) the rotor has 50 teeth;
(b) the stator has a 50-tooth pitch; and
(c) when the drive phases are energized in the four-step sequence: positive/positive, positive/negative, negative/negative, and negative/positive, the rotor will rotate one tooth pitch for each four-step change in energization.

14. The stepping motor as defined in claim 10, wherein:
(a) the rotor has 50 teeth;
(b) the stator has a 52-tooth pitch; and
(c) when the drive phases are energized in the four-step sequence: positive/positive, positive/negative, negative/negative, and negative/positive, the rotor will rotate one tooth pitch for each four-step change in energization.

15. The stepping motor as defined in claim 10, wherein:
(a) the rotor has 50 teeth;
(b) the stator has a variable-tooth pitch; and
(c) when the drive phases are energized in the four-step sequence: positive/positive, positive/negative, negative/negative, and negative/positive, the rotor will rotate one tooth pitch for each four-step change in energization.

16. The stepping motor as defined in claim 11, wherein:
(a) the rotor has 50 teeth;
(b) the stator has a 48-tooth pitch; and
(c) when the drive phases are energized in the four-step sequence: positive/positive, positive/negative, negative/negative, and negative/positive, the rotor will rotate one tooth pitch for each four-step change in energization.

17. The stepping motor as defined in claim 11, wherein:
(a) the rotor has 50 teeth;
(b) the stator has a 50-tooth pitch; and
(c) when the drive phases are energized in the four-step sequence: positive/positive, positive/negative, negative/negative, and negative/positive, the rotor will rotate one tooth pitch for each four-step change in energization.

18. The stepping motor as defined in claim 11, wherein:
(a) the rotor has 50 teeth;
(b) the stator has a 52-tooth pitch; and
(c) when the drive phases are energized in the four-step sequence: positive/positive, positive/negative, negative/negative, and negative/positive, the rotor will rotate one tooth pitch for each four-step change in energization.

19. The stepping motor as defined in claim 11, wherein:
(a) the rotor has 50 teeth;
(b) the stator has a variable-tooth pitch; and
(c) when the drive phases are energized in the four-step sequence: positive/positive, positive/negative, negative/negative, and negative/positive, the rotor will rotate one tooth pitch for each four-step change in energization.

20. The stepping motor as defined in any of claims 12 throug 19, wherein the coils on the stator poles are connected in series to their respective drive phases.

21. The stepping motor as defined in any of claims 12 through 19, wherein the coils on the stator poles are connected in parallel to their respective drive phases.

* * * * *